United States Patent
Jones

(10) Patent No.: US 7,326,881 B2
(45) Date of Patent: Feb. 5, 2008

(54) FLOOR HEATING SYSTEM

(75) Inventor: Thaddeus M. Jones, Bremen, IN (US)

(73) Assignee: MSX, Inc., South Bend, IN (US)

(\*) Notice: Subject to any disclaimer, the term of this patent is extended or adjusted under 35 U.S.C. 154(b) by 14 days.

(21) Appl. No.: 11/343,782

(22) Filed: Jan. 31, 2006

(65) Prior Publication Data
US 2007/0175878 A1    Aug. 2, 2007

(51) Int. Cl.
*H05B 3/00* (2006.01)
(52) U.S. Cl. .................... 219/213; 219/228; 219/542
(58) Field of Classification Search ............ 219/213, 219/542, 548, 528; 392/433, 435
See application file for complete search history.

(56) References Cited

U.S. PATENT DOCUMENTS

| | | | | |
|---|---|---|---|---|
| 2,503,601 A * | 4/1950 | Tice | .................. | 219/213 |
| 2,540,465 A * | 2/1951 | Tice | .................. | 219/213 |
| 2,612,585 A * | 9/1952 | McCann | .............. | 392/435 |
| 2,845,519 A * | 7/1958 | Willat | ............... | 219/528 |
| 3,015,016 A * | 12/1961 | Cole | ................. | 392/435 |
| 3,031,605 A * | 4/1962 | Whitcroft et al. | ........ | 318/759 |
| 3,095,491 A * | 6/1963 | Deacon | ............... | 392/435 |
| 3,223,825 A * | 12/1965 | Williams | ............ | 219/213 |
| 4,878,332 A * | 11/1989 | Drake | ............... | 52/745.05 |
| 5,824,996 A * | 10/1998 | Kochman et al. | ........ | 219/529 |
| 6,184,505 B1 * | 2/2001 | Jones | ............... | 219/520 |

\* cited by examiner

*Primary Examiner*—Tu Ba Hoang
*Assistant Examiner*—Vinod Patel
(74) *Attorney, Agent, or Firm*—Taylor & Aust, P.C.

(57) ABSTRACT

A floor heating system including a sub-floor, a plurality of fasteners, a first heater conductor assembly and a second heater conductor assembly. The first conductor assembly including a first resistive conductor having a first length, first and second ends, and two low resistance conductors. The two low resistance conductors being respectively connected to each of the first and second ends. The second heater conductor assembly including a second resistive conductor having a second length, first and second ends, and two low resistance conductors. The two low resistance conductors being respectively connected to each of the first and second ends of the second resistive conductor. The low resistance conductor that is connected to the first end of the first resistive conductor being connected in a serial fashion to the low resistance conductor that is connected to the first end of the second resistive conductor. The first length being approximately a first integer multiple of the second length. The first resistive conductor and the second resistive conductor having substantially the same resistivity per unit of length. The plurality of fasteners connecting the first heater conductor assembly and the second heater conductor assembly to the sub-floor.

13 Claims, 4 Drawing Sheets

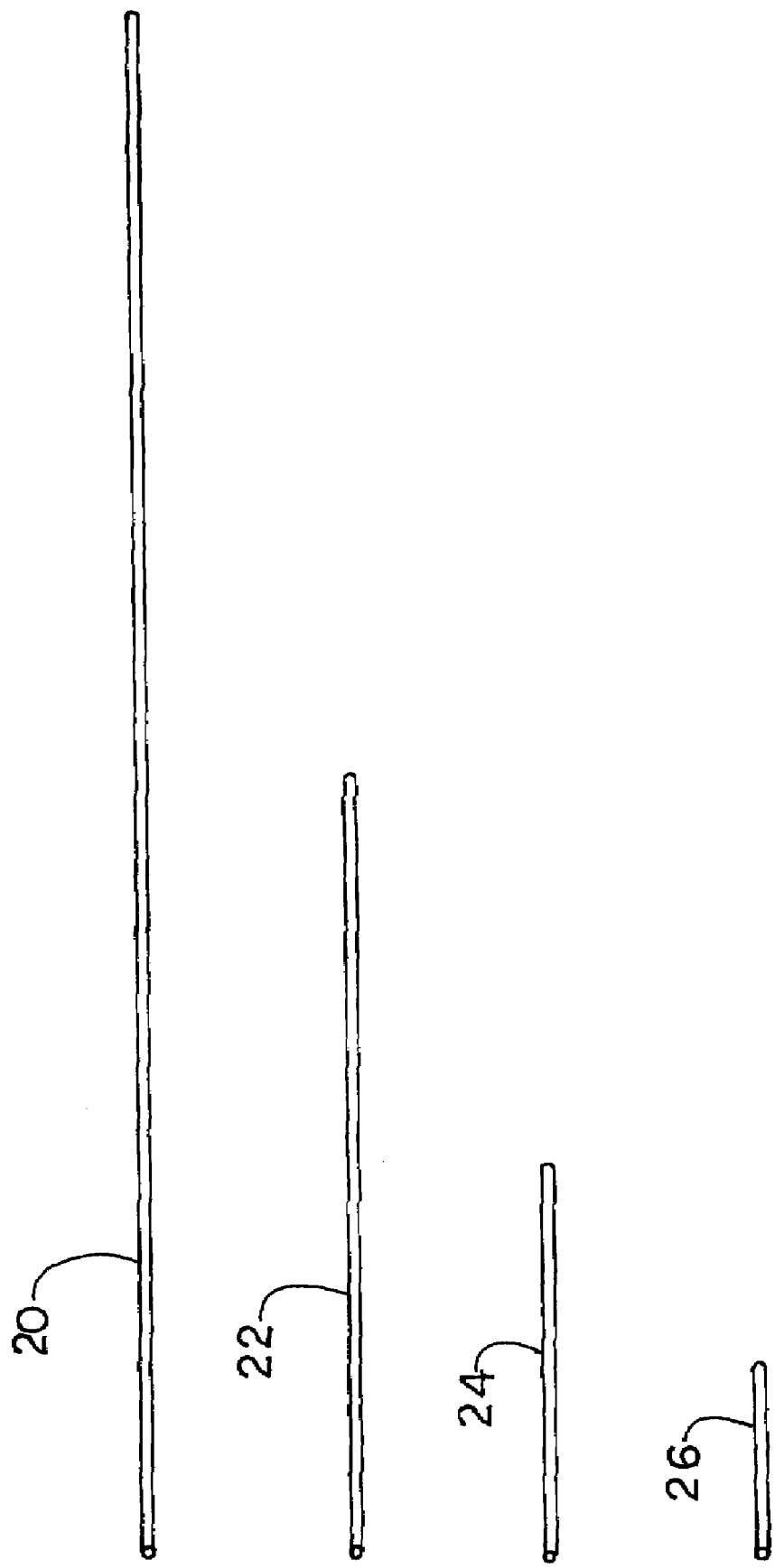

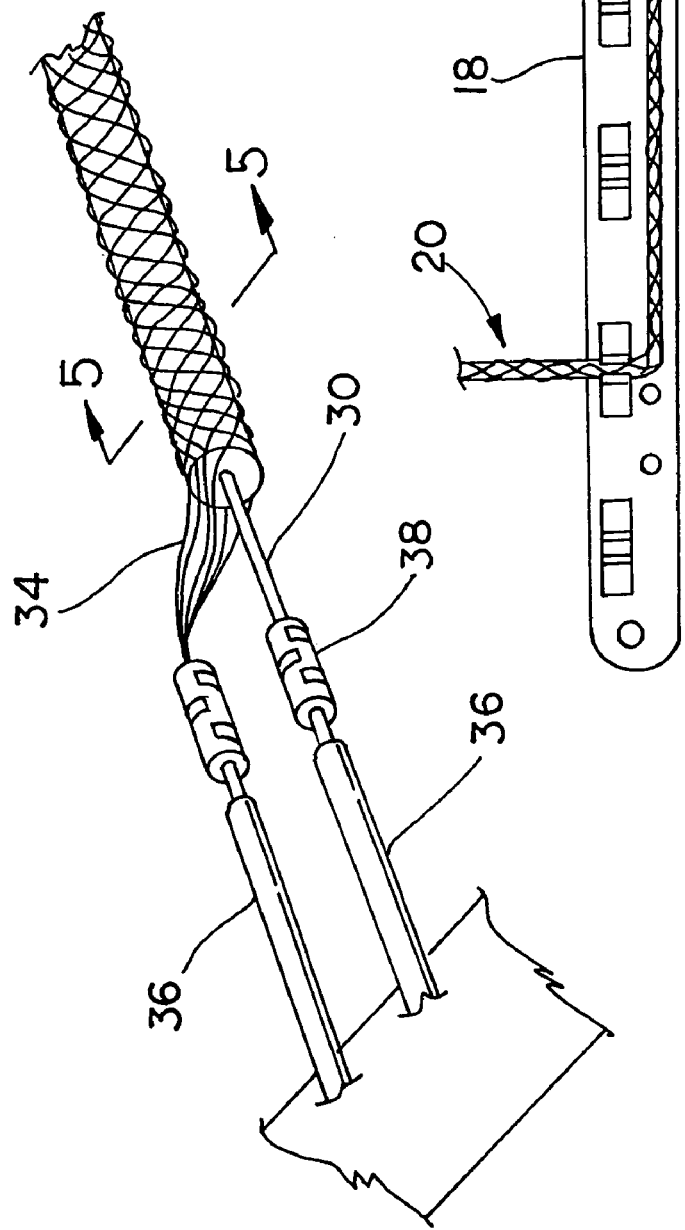
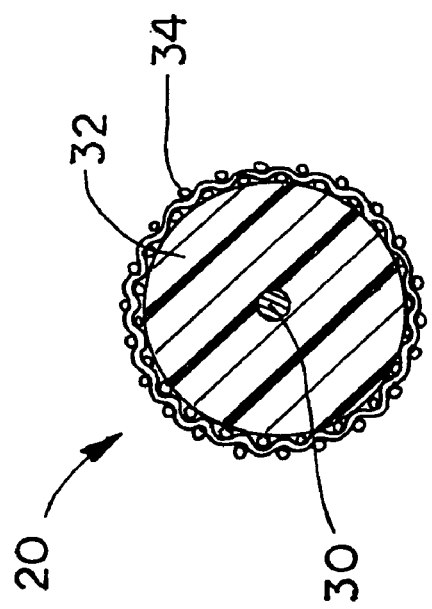

FLOOR HEATING SYSTEM

BACKGROUND OF THE INVENTION

1. Field of the Invention

The present invention relates to a floor heating system, and, more particularly, to an electrical floor heating system.

2. Description of the Related Art

Under floor heating systems date back thousands of years including Roman and Korean heating system where stone slabs are installed on an upper part of flues in a hypocaust connected with a fuel feeding port and a chimney. A burning fuel, such as wood or coal is burnt thereby heating the floor from the underneath side. The problem with this system is that a lot of thermal energy is drawn off by way of the fuel feeding hole and the chimney when a fire is not kindled therein. Some modern floor heating systems include the circulation of a heated thermal medium fluid through long, thin seamless pipes disposed beneath a floor. A floor heating system that involves the circulation of a thermal medium fluid has a portion of a floor that is heated to a higher temperature than a portion of the floor associated with the end of the circulation path. For example, the temperature of the heated thermal medium as it circulates gradually decreases in temperature causing the portion that is first heated to be heated to a higher temperature than the area of the floor associated with the end of the circulation path.

The installation of electrical heating wires disposed in or beneath the floor have to be selected for their resistivity, which will result in a proper resistance load for the power system. In order to provide an adequate selection of resistivities a large stock of heating wires are required to provide an adequate power density and yet still meet the power constraints of the power source. A problem with this approach is that a significant number of resistive wires must be inventoried to meet a range of floor areas.

What is needed in the art is a method of providing an under floor heating wiring that will reduce the required inventory to meet the power density for heating the floor.

SUMMARY OF THE INVENTION

The present invention provides a multi-segment heater for use in a floor heating system The invention comprises, in one form thereof, a floor heating system including a sub-floor, a plurality of fasteners, a first heater conductor assembly and a second heater conductor assembly. The first conductor assembly including a first resistive conductor having a first length, first and second ends, and two low resistance conductors. The two low resistance conductors being respectively connected to each of the first and second ends. The second heater conductor assembly including a second resistive conductor having a second length, first and second ends, and two low resistance conductors. The two low resistance conductors being respectively connected to each of the first and second ends of the second resistive conductor. The low resistance conductor that is connected to the first end of the first resistive conductor being connected in a serial fashion to the low resistance conductor that is connected to the first end of the second resistive conductor. The first length being approximately a first integer multiple of the second length. The first resistive conductor and the second resistive conductor having substantially the same resistivity per unit of length. The plurality of fasteners connecting the first heater conductor assembly and the second heater conductor assembly to the sub-floor.

An advantage of the present invention is that the heating system reduces the number of different resistivity wires that must be stocked to meet the power density required for heating a range of floor areas.

Another advantage of the present invention is that the segments can be easily butt spliced together.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a schematic representation of lengths of resistive conductors utilized in the floor heating system of FIG. 1;

FIG. 3 illustrates a termination of an end of a resistive conductor utilized in FIGS. 1 and 2;

FIG. 4 illustrates fastening of a heating conductor utilized in FIGS. 1-3;

FIG. 5 is a cross-sectional view of the heating cable taken along line 5-5 of FIG. 3.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
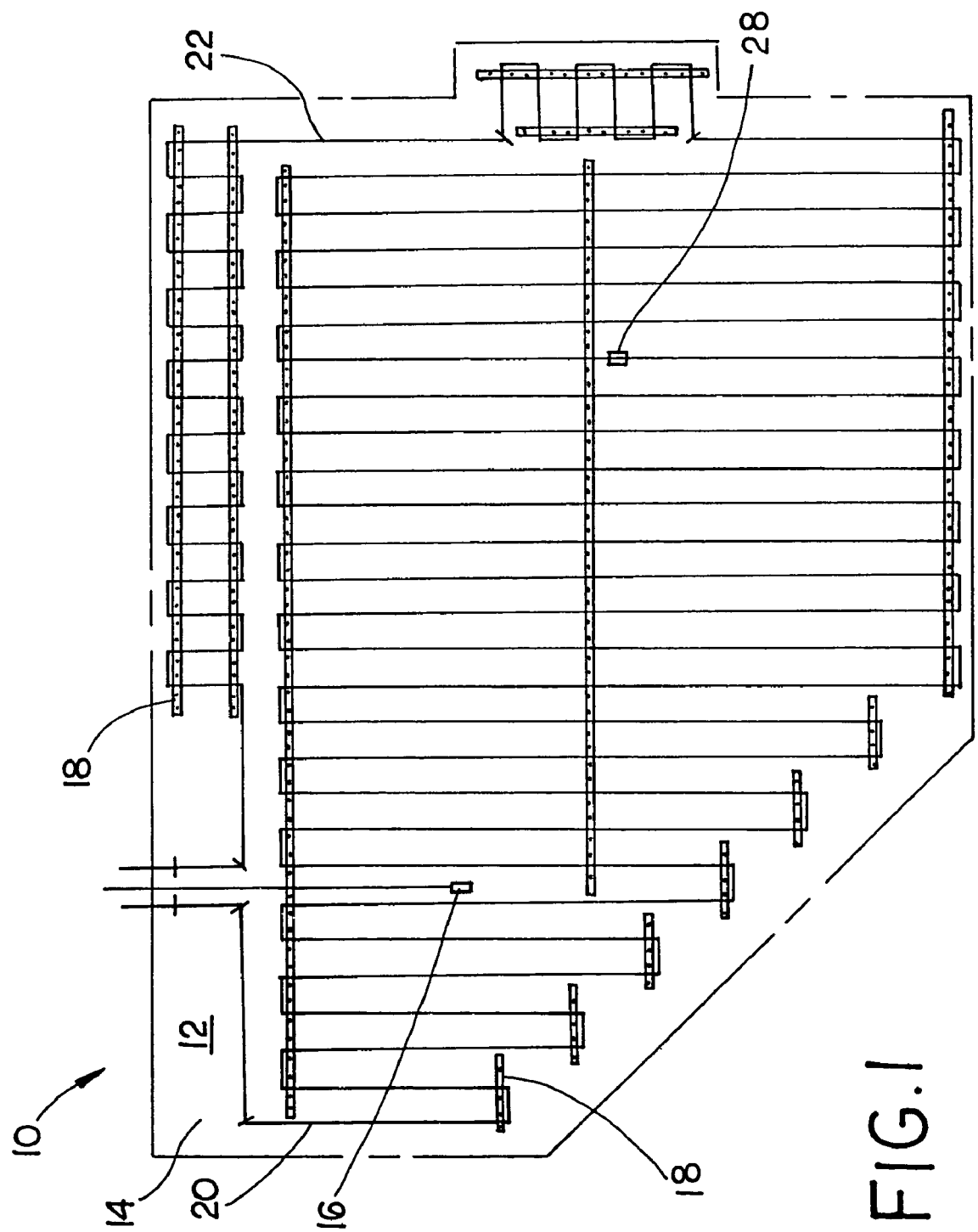
FIG. 1 is a representative view of an embodiment of a floor heating system of the present invention.
Figure 6:
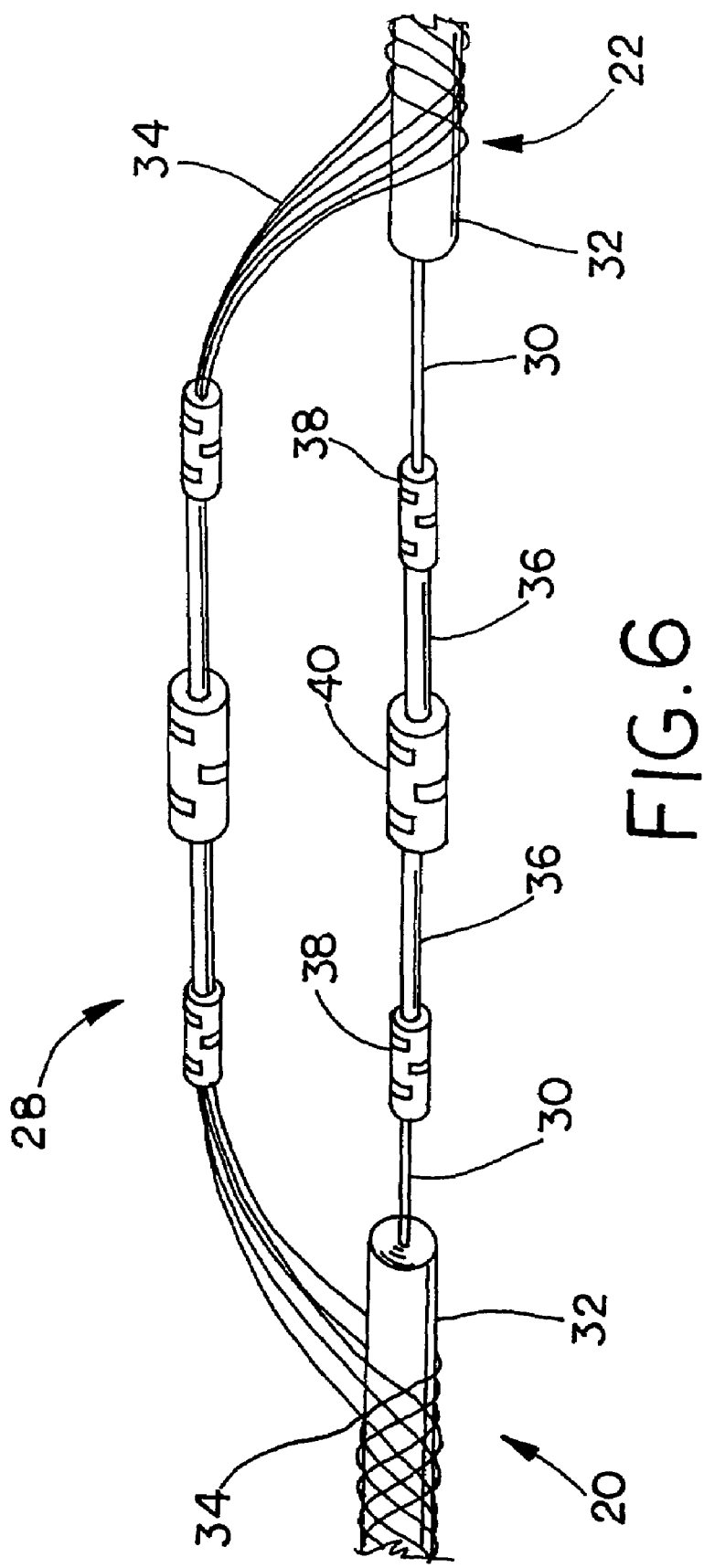
FIG. 6 illustrates a method of splicing ends of the heating cable illustrated in FIGS. 1-5.

Referring now to the drawings, and more particularly to FIG. 1, there is shown a floor heating system 10 installed upon a floor 12. Floor 12 has a surface area 14, which is utilized in the calculation of the resistivity of the heating conductors as well as the lengths of the heating conductors. Floor heating system 10 includes a temperature sensor 16, fasteners 18, a first resistive conductor assembly 20 and a second resistive conductor assembly 22. Floor 12 is a base floor, also known as a sub-floor 12, which may underlie a finished floor in an area in which a heated floor such as a ceramic floor is desirable. Onto floor 12 there is attached fasteners 18, which may be in the form of clips 18 to which first resistive conductor assembly and second resistive conductor assembly 22 is attached. The use of two resistive conductor assemblies in this illustration is illustrative of the current method and more than two resistive conductor assemblies may be utilized in this invention. Temperature sensor 16 is connected to a controller that detects the temperature of floor 12 and regulates the duration and/or current supplied to resistive conductor assemblies 20 and 22. Resistive conductor assemblies 20 and 22 are laid out in a pattern so as to uniformly distribute heat to floor 12. The layout of resistive conductor assemblies 20 and 22 may be in a serpentine manner and may be separated into smaller serpentine patterns. A splice 28 connects first resistive conductor assembly 20 to second resistive conductor assembly 22.

Now, additionally referring to FIGS. 2-6, and more particularly to FIG. 2 there is shown resistive conductor assemblies 20, 22, 24 and 26. FIG. 2 illustrates four lengths, with resistive conductor assembly 20 being the longest and resistive conductor assembly 22 being half of the length of resistive conductor assembly 20. In a like manner, resistive conductor assembly 24 is half of the length of resistive conductor assembly 22 and one-fourth the length of resistive conductor assembly 20. Likewise, resistive conductor assembly 26 is half of the length of resistive conductor assembly 24, one-fourth the length of resistive conductor assembly 22, and one-eighth the length of resistive conductor 20. There exists a substantial doubling in length from resistive conductor assembly 26 to each preceding conductor assembly. The relationship of the lengths of each resistive conductor assembly is utilized in the present invention to reduce the quantities of resistive conductors that are necessary to be inventoried by a supplier. Each resistive conductor assembly 20, 22, 24 and 26 includes a resistive wire 30 surrounded by electrical insulation 32 and an outer shield 34, which may be of a woven wire configuration. Connected to resistive wire 30 is a cold conductor 36 that is connected thereto by way of a cold end splice 38. If two resistive conductor assemblies are being joined together, cold conductors 36 are connected by way of a butt splice 40. The cold end splices simplify the installation by allowing a less skilled installation person to perform the necessary crimping of a cold conductor. Typically a cold end splice of an end of a resistive conductor to a cold conductor 36 involves splicing an eighteen gauge wire 36 to a solid copper-nickel alloy heater wire 30 in the range of 20 to 30 gauge. This requires special training that is not available to a typical installation person. The splicing of resistive wire 30 to cold conductor 36 has to be properly done so as to not create potential hot spots, which may cause the electrical connection to fail. A butt splice 40 of two cold conductors 36 can be done without the potential of the problems that can be encountered with the splicing of the copper-nickel alloy resistive wire 30 to cold conductor 36. This technique of having pre-applied cold conductors 36 to resistive wires 30 allows for easy installation by less skilled individuals.

In the current art many different resistances of heater wire have to be stocked, often over twenty, in order to have sufficient values of total resistance of a single wire to provide an adequate power density to the floor, while not being too low of a resistance for the length to avoid overdrawing the power source and tripping a circuit breaker. Wire manufacturers charge premium prices for wire purchased in lengths of less than 100,000 feet, so there is an advantage to purchasing fewer types of resistivity wire. The present invention teaches a method of spanning variable floor area of a factor of eight with only three wire resistances. This constitutes an area range of approximately 8:1 with only three required resistances.

The present invention involves a binary scheme. Each of the three wire resistivities span a 2:1 floor area range, based on a tolerance of power density that can be reasonably imparted to floor 12, by way of a controller. Next, within any area range, resistive conductor assemblies 20, 22, 24 and 26 can be selected for the individual lengths, thereby spanning potentially significant variations in area. For example, assuming that resistive conductor assembly 20 has a length of 200 feet; then resistive conductor assembly 22 has a length of 100 feet; resistive conductor assembly 24 has a length of 50 feet; and resistive conductor assembly 26 has a length of 25 feet. For a floor area 12 that requires two conductor assemblies, such as that illustrated in FIG. 1, conductor assembly 20 and may be selected to meet the need for area 14. Adding different combinations of the lengths of resistive conductor assemblies 20-26 illustrate how they can produce a significant number of variable lengths of resistive conductor assemblies 20-26.

To further illustrate the potential range of areas that can be heated at a substantially similar heat density, the following tables illustrate a range from 13 square feet to 100 square feet that is covered with three resistivities of wire. Each installation kit has a single resistivity of wire with four resistive conductor assemblies of lengths as described herein.

TABLE NO. 1

| | |
|---|---|
| Max heated area = | 100 (feet$^2$) |
| Min heated area = | 50 (feet$^2$) |
| Line voltage = | 120 (volts) |
| Line current = | 6.7 (amps) |
| Heater power = | 800 (watts) |
| Max heater length = | 375 (feet) |
| Heater ohms/k-ft = | 45 (ohms per 1000 feet) |

In the tables that follow:

| WIRE LENGTHS (FEET) | | | | | | | | |
|---|---|---|---|---|---|---|---|---|
| L0 | L1 | L3 | L4 | TOT | OHMS | WATTS | AMPS | AREA |
| 200 | 0 | 0 | 0 | 200 | 9.0 | 1600 | 13.3 | 50 |
| 200 | 0 | 0 | 25 | 225 | 10.1 | 1422 | 11.9 | 56 |
| 200 | 0 | 50 | 0 | 250 | 11.3 | 1280 | 10.7 | 63 |
| 200 | 0 | 50 | 25 | 275 | 12.4 | 1164 | 9.7 | 69 |
| 200 | 100 | 0 | 0 | 300 | 13.5 | 1067 | 8.9 | 75 |
| 200 | 100 | 0 | 25 | 325 | 14.6 | 985 | 8.2 | 81 |
| 200 | 100 | 50 | 0 | 350 | 15.8 | 914 | 7.6 | 88 |
| 200 | 100 | 50 | 25 | 375 | 16.9 | 853 | 7.1 | 94 |

L0 = Base heater wire length (feet)
L1 = First selectable heater wire length (feet)
L2 = Second selectable heater wire length (feet)
L3 = Third selectable heater wire length (feet)
TOT = Total heater wire length (feet)
OHMS = Resistance of total heater wire length (ohms)
WATTS = Total power dissipated by the heater wire (watts)
AMPS = Heater current (amps)
AREA = Heated floor area (feet$^2$)

TABLE NO. 2

| | |
|---|---|
| Max heated area = | 50 (feet$^2$) |
| Min heated area = | 25 (feet$^2$) |
| Line voltage = | 120 (volts) |
| Line current = | 3.3 (amps) |
| Heater power = | 400 (watts) |
| Max heater length = | 200 (feet) |
| Heater ohms/k-ft = | 180 (ohms per 1000 feet) |

| WIRE LENGTHS (FEET) | | | | | | | | |
|---|---|---|---|---|---|---|---|---|
| L0 | L1 | L3 | L4 | TOT | OHMS | WATTS | AMPS | AREA |
| 100 | 0 | 0 | 0 | 100 | 18.0 | 800 | 6.7 | 25 |
| 100 | 0 | 0 | 13 | 113 | 20.3 | 711 | 5.9 | 28 |
| 100 | 0 | 25 | 0 | 125 | 22.5 | 640 | 5.3 | 31 |
| 100 | 0 | 25 | 13 | 138 | 24.8 | 582 | 4.8 | 34 |
| 100 | 50 | 0 | 0 | 150 | 27.0 | 533 | 4.4 | 38 |
| 100 | 50 | 0 | 13 | 163 | 29.3 | 492 | 4.1 | 41 |
| 100 | 50 | 25 | 0 | 175 | 31.5 | 457 | 3.8 | 44 |
| 100 | 50 | 25 | 13 | 188 | 33.7 | 427 | 3.6 | 47 |

TABLE NO. 3

| Max heated area = | 25 (feet²) |
|---|---|
| Min heated area = | 13 (feet²) |
| Line voltage = | 120 (volts) |
| Line current = | 1.7 (amps) |
| Heater power = | 200 (watts) |
| Max heater length = | 100 (feet) |
| Heater ohms/k-ft = | 720 (ohms per 1000 feet) |

WIRE LENGTHS (FEET)

| L0 | L1 | L3 | L4 | TOT | OHMS | WATTS | AMPS | AREA |
|---|---|---|---|---|---|---|---|---|
| 50 | 0  | 0  | 0 | 50 | 36.0 | 400 | 3.3 | 13 |
| 50 | 0  | 0  | 6 | 56 | 40.5 | 356 | 3.0 | 14 |
| 50 | 0  | 13 | 0 | 63 | 45.0 | 320 | 2.7 | 16 |
| 50 | 0  | 13 | 6 | 69 | 49.5 | 291 | 2.4 | 17 |
| 50 | 25 | 0  | 0 | 75 | 54.0 | 267 | 2.2 | 19 |
| 50 | 25 | 0  | 6 | 81 | 58.5 | 246 | 2.1 | 20 |
| 50 | 25 | 13 | 0 | 88 | 63.0 | 229 | 1.9 | 22 |
| 50 | 25 | 13 | 6 | 94 | 67.5 | 213 | 1.8 | 23 |

The foregoing tables illustrate the connection of certain combinations of lengths of resistive conductors, which are utilized based upon the square footage of the area to be heated. For example, if the area of floor to be heated is 75 square feet then the installation kit, which corresponds to Table 1 would be selected and then within the selected kit a 200 foot and a 100 resistive conductor assembly would be chosen and installed, which would provide a potential of 1,067 watts, of heating capacity. In a like manner if the area to be heated is 23 square feet then a kit, which corresponds to Table 3 would be selected and all four wires would be serially connected by way of butt slices 40 to arrive at a total wire length of 94 feet.

The line current referred to in each table is an average current needed to provide the watts of heated power. The controller alters the duration and/or the amount of current being applied to the resistive conductors. The heater power referred to in each table is the desired heat, which in each table is met by each of the wiring combinations presented therein.

The present invention includes spanning nearly a ten fold difference in floor area with three distances of wire, with each of the three kits having conductor assemblies 20-28 of four different, binarilly weighted lengths.

The advantages of the invention are economic by reducing the amount of wire necessary to be inventoried and provide kits, with a substantial range of heated floor capacity. Another advantage of the present invention is that in the event one segment of the heater cable is damaged during installation, the damaged piece can be removed making it unnecessary to replace the entire cable in the event of damage.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A floor heating system, comprising:
   a sub-floor;
   a plurality of fasteners;
   a first heater conductor assembly including:
      a first resistive conductor having a first length, and first and second ends said first resistive conductor being of a first gauge; and
      two low resistance conductors being respectively connected to each of said first and second ends, said low resistant conductors being of a second gauge, said first gauge being a larger numeric value than said second gauge; and
   a second heater conductor assembly including:
      a second resistive conductor having a second length, and first and second ends, said second resistive conductor being of said first gauge; and
      two low resistance conductors being respectively connected to each of said first and second ends of said second resistive conductor, said low resistant conductors being of said second gauge, said low resistance conductor that is connected to said first end of said first resistive conductor being connected in a serial fashion to said low resistance conductor that is connected to said first end of said second resistive conductor, said first length being approximately a first integer multiple of said second length, said first resistive conductor and said second resistive conductor having substantially the same resistivity per unit of length, said plurality of fasteners connecting said first heater conductor assembly and said second heater conductor assembly to said sub-floor, said first integer being larger than 1.

2. The system of claim 1, further comprising a third heater conductor assembly having a third resistive conductor with a third length, said first length being approximately a second integer multiple of said third length, said third heater conductor assembly being electrically connected to at least one of said first heater conductor assembly and said second heater conductor assembly, said second integer being larger than 2.

3. The system of claim 2, further comprising a fourth heater conductor assembly having a fourth resistive conductor with a fourth length, said first length being approximately a third integer multiple of said fourth length, said fourth heater conductor assembly being electrically connected to at least one of said first heater conductor assembly, said second heater conductor assembly and said third heater conductor assembly, said third integer being larger than 3.

4. The system of claim 3, wherein said first integer is 2, said second integer is 4, and said third integer is 8.

5. The system of claim 4, wherein said first resistive conductor, said second resistive conductor, said third resistive conductor and said fourth resistive conductor each have substantially the same resistivity per unit of length.

6. The system of claim 5, wherein said first end of said first resistive conductor is connected to said low resistance conductor by way of a butt splice.

7. A multi-segment electrical heater system kit for installation in a floor, the kit, comprising:
   a first heater conductor assembly including:
      a first resistive conductor having a first length, and first and second ends, said first resistive conductor being of a first gauge; and
      two low resistance conductors being respectively connected to each of said first and second ends, said low resistant conductors being of a second gauge, said first gauge being a larger numeric value than said second gauge; and a second heater conductor assembly including:
- a second resistive conductor having a second length, and first and second ends; and
- two low resistance conductors being respectively connected to each of said first and second ends of said second resistive conductor, said low resistance conductor that is connected to said first end of said first resistive conductor being connectable in a serial fashion to said low resistance conductor that is connected to said first end of said second resistive conductor, said first length being approximately a first integer multiple of said second length, said first resistive conductor and said second resistive conductor having substantially the same resistivity per unit of length, said first integer being larger than 1.

8. The kit of claim 7, further comprising a third heater conductor assembly including a third resistive conductor having a third length, said first length being approximately a second integer multiple of said third length, said second integer being larger than 2.

9. The kit of claim 8, further comprising a fourth heater conductor assembly including a fourth resistive conductor having a fourth length, said first length being approximately a third integer multiple of said fourth length, said third integer being larger than 3.

10. The kit of claim 9, wherein said first integer is 2, said second integer is 4, and said third integer is 8.

11. The kit of claim 10, wherein said first resistive conductor, said second resistive conductor, said third resistive conductor and said fourth resistive conductor each have substantially the same resistivity per unit of length.

12. The kit of claim 11, wherein said first end of said first resistive conductor is connected to said low resistance conductor by way of a butt splice.

13. The kit of claim 7, wherein said low resistance conductors are of a first gauge, and said first resistive conductor and said second resistive conductor are of a second gauge, said first gauge being a smaller number that said second gauge.

* * * * *

UNITED STATES PATENT AND TRADEMARK OFFICE
CERTIFICATE OF CORRECTION

PATENT NO. : 7,326,881 B2
APPLICATION NO. : 11/343782
DATED : February 5, 2008
INVENTOR(S) : Jones It is certified that error appears in the above-identified patent and that said Letters Patent is hereby corrected as shown below:

COLUMN 3
    At line 65, please delete "20 and may", and substitute therefore --20 and 22 may--.

COLUMN 4
    At line 26, following "In the tables that follow:", please insert:

--L0 = Base heater wire length (feet)
    L1 = First selectable heater wire length (feet)
    L2 = Second selectable heater wire length (feet)
    L3 = Third selectable heater wire length (feet)
    TOT = Total heater wire length (feet)
    OHMS = Resistance of total heater wire length (ohms)
    WATTS= Total power dissipated by the heater wire (watts)
    AMPS = Heater current (amps)
    AREA = Heated floor area (feet$^2$)--

COLUMN 4
    At line 39, please delete the following:
    "L0 = Base heater wire length (feet)
    L1 = First selectable heater wire length (feet)
    L2 = Second selectable heater wire length (feet)
    L3 = Third selectable heater wire length (feet)
    TOT = Total heater wire length (feet)
    OHMS = Resistance of total heater wire length (ohms)
    WATTS= Total power dissipated by the heater wire (watts)
    AMPS = Heater current (amps)
    AREA = Heated floor area (feet$^2$)"

UNITED STATES PATENT AND TRADEMARK OFFICE
CERTIFICATE OF CORRECTION

PATENT NO.         : 7,326,881 B2
APPLICATION NO. : 11/343782
DATED              : February 5, 2008
INVENTOR(S)        : Jones It is certified that error appears in the above-identified patent and that said Letters Patent is hereby corrected as shown below:

COLUMN 5
    At line 27, after "100", please insert --foot--;
    At line 28, after "potential", please insert --total--; and
    At line 42, please delete "distances", and substitute therefore --resistances--.

Signed and Sealed this

Fourteenth Day of October, 2008

JON W. DUDAS
*Director of the United States Patent and Trademark Office*